(12) United States Patent
Girson et al.

(10) Patent No.: US 7,111,179 B1
(45) Date of Patent: Sep. 19, 2006

(54) METHOD AND APPARATUS FOR OPTIMIZING PERFORMANCE AND BATTERY LIFE OF ELECTRONIC DEVICES BASED ON SYSTEM AND APPLICATION PARAMETERS

(75) Inventors: Andrew Girson, Gaithersburg, MD (US); Boris Donskoy, Herndon, VA (US); Nathan Tennies, N. Chevy Chase, MD (US)

(73) Assignee: In-Hand Electronics, Inc., Rockville, MD (US)

( * ) Notice: Subject to any disclaimer, the term of this patent is extended or adjusted under 35 U.S.C. 154(b) by 101 days.

(21) Appl. No.: 10/268,914

(22) Filed: Oct. 11, 2002

Related U.S. Application Data

(60) Provisional application No. 60/333,535, filed on Oct. 11, 2001.

(51) Int. Cl.
  *G06F 1/32* (2006.01)
(52) U.S. Cl. .................. 713/300; 713/320; 320/130
(58) Field of Classification Search ............... 320/135, 320/155, 130–132, 156; 324/426; 702/62, 702/64; 713/321–323, 300, 320
  See application file for complete search history.

(56) References Cited

U.S. PATENT DOCUMENTS

| | | | |
|---|---|---|---|
| 3,922,526 A | 11/1975 | Cochran | 713/321 |
| 4,137,563 A | 1/1979 | Tsunoda | 713/601 |
| 4,670,837 A | 6/1987 | Sheets | 713/501 |
| 4,823,292 A | 4/1989 | Hillion | 713/321 |
| 4,851,987 A | 7/1989 | Day | 713/601 |
| 4,893,271 A | 1/1990 | Davis et al. | 713/501 |
| 4,979,507 A | 12/1990 | Heinz et al. | 607/28 |
| 5,086,387 A | 2/1992 | Arroyo et al. | 713/501 |
| 5,142,684 A | 8/1992 | Perry et al. | 713/320 |
| 5,189,647 A | 2/1993 | Suzuki et al. | 368/10 |
| 5,218,704 A | 6/1993 | Watts, Jr. et al. | 713/322 |
| 5,230,056 A | 7/1993 | Hoshina | 713/340 |
| 5,230,074 A | 7/1993 | Canova, Jr. et al. | 714/14 |
| 5,237,692 A | 8/1993 | Raasch et al. | 710/267 |
| 5,239,652 A | 8/1993 | Seibert et al. | 713/323 |
| 5,245,629 A | 9/1993 | Hall | 455/522 |
| 5,307,003 A | 4/1994 | Fairbanks et al. | 323/222 |
| 5,325,048 A * | 6/1994 | Longini | 324/74 |
| 5,339,445 A | 8/1994 | Gasztonyi | 713/324 |
| 5,369,771 A | 11/1994 | Gettel | 713/322 |
| 5,383,137 A | 1/1995 | Burch | 703/23 |
| 5,386,577 A | 1/1995 | Zenda | 713/340 |
| 5,416,726 A | 5/1995 | Garcia-Duarte et al. | 713/300 |
| 5,452,277 A | 9/1995 | Bajorek et al. | 369/53.18 |
| 5,475,847 A | 12/1995 | Ikeda | 713/322 |
| 5,493,684 A | 2/1996 | Gephardt et al. | 713/322 |
| 5,493,685 A | 2/1996 | Zenda | 713/340 |
| 5,504,776 A | 4/1996 | Yamaura et al. | 375/141 |
| 5,504,908 A | 4/1996 | Ikeda | 713/300 |

(Continued)

FOREIGN PATENT DOCUMENTS

EP  0363567  4/1990

(Continued)

*Primary Examiner*—Donald Sparks
(74) *Attorney, Agent, or Firm*—Edell, Shapiro & Finnan, LLC

(57) ABSTRACT

An electronic device (e.g., computer system, etc.) employing dynamic power management of the present invention adjusts power consumption in accordance with an analysis of parameters and events occurring over one or more time-periods. Preferably, the electronic device monitors microprocessor, operating system, peripheral and/or device-level events and adjusts run-time parameters, such as microprocessor clock frequency and voltage, to reduce power consumption with minimal perceived degradation in performance.

42 Claims, 6 Drawing Sheets

U.S. PATENT DOCUMENTS

| | | | |
|---|---|---|---|
| 5,524,249 A | 6/1996 | Suboh | 713/322 |
| 5,546,568 A | 8/1996 | Bland et al. | 713/501 |
| 5,585,745 A | 12/1996 | Simmons et al. | 326/93 |
| 5,585,750 A | 12/1996 | Noguchi et al. | 327/113 |
| 5,600,229 A | 2/1997 | Oh | 320/162 |
| 5,619,707 A | 4/1997 | Suboh | 713/322 |
| 5,623,647 A | 4/1997 | Maitra | 713/501 |
| 5,625,826 A | 4/1997 | Atkinson | 713/322 |
| 5,628,001 A | 5/1997 | Cepuran | 713/501 |
| 5,664,203 A | 9/1997 | Hong et al. | 713/323 |
| 5,675,808 A | 10/1997 | Gulick et al. | 713/322 |
| 5,680,626 A | 10/1997 | Chu et al. | 713/322 |
| 5,682,273 A | 10/1997 | Hetzler | 360/75 |
| 5,691,948 A | 11/1997 | Sakabe | 365/227 |
| 5,692,197 A | 11/1997 | Narad et al. | 713/323 |
| 5,699,336 A | 12/1997 | Maeda et al. | 369/53.18 |
| 5,708,821 A | 1/1998 | Takikita | 713/310 |
| 5,715,467 A | 2/1998 | Jirgal | 713/300 |
| 5,721,935 A | 2/1998 | DeSchepper et al. | 713/323 |
| 5,734,711 A | 3/1998 | Kleffner | 379/323 |
| 5,748,103 A | 5/1998 | Flach et al. | 340/870.07 |
| 5,752,011 A | 5/1998 | Thomas et al. | 713/501 |
| 5,752,045 A | 5/1998 | Chen | 713/322 |
| 5,754,867 A | 5/1998 | Walker | 713/322 |
| 5,758,172 A | 5/1998 | Seo | 713/300 |
| 5,777,914 A | 7/1998 | Larsson et al. | 708/322 |
| 5,781,783 A | 7/1998 | Gunther et al. | 713/320 |
| 5,794,146 A | 8/1998 | Sevcik et al. | 455/434 |
| 5,799,198 A | 8/1998 | Fung | 713/323 |
| 5,815,693 A | 9/1998 | McDermott et al. | 713/501 |
| 5,825,156 A | 10/1998 | Patillon et al. | 702/63 |
| 5,825,674 A | 10/1998 | Jackson | 713/321 |
| 5,832,280 A | 11/1998 | Swanberg | 713/300 |
| 5,861,006 A | 1/1999 | Kroll | 607/5 |
| 5,864,702 A | 1/1999 | Walsh et al. | 713/320 |
| 5,892,959 A | 4/1999 | Fung | 713/323 |
| 5,913,068 A | 6/1999 | Matoba | 713/322 |
| 5,926,640 A | 7/1999 | Mason et al. | 713/320 |
| 5,930,516 A | 7/1999 | Watts, Jr. et al. | 713/322 |
| 5,948,105 A | 9/1999 | Skurnik et al. | 713/323 |
| 5,953,536 A | 9/1999 | Nowlin, Jr. | 713/323 |
| 5,974,556 A | 10/1999 | Jackson et al. | 713/322 |
| 5,983,357 A | 11/1999 | Sun | 713/324 |
| 5,991,883 A | 11/1999 | Atkinson | 713/300 |
| 5,996,084 A | 11/1999 | Watts | 713/323 |
| 6,006,336 A | 12/1999 | Watts, Jr. et al. | 713/322 |
| 6,044,282 A | 3/2000 | Hlasny | 455/573 |
| 6,073,244 A | 6/2000 | Iwazaki | 713/322 |
| 6,078,209 A | 6/2000 | Linoff | 327/513 |
| 6,079,022 A | 6/2000 | Young | 713/300 |
| 6,079,025 A | 6/2000 | Fung | 713/323 |
| 6,112,309 A | 8/2000 | Inoue et al. | 713/501 |
| 6,122,234 A | 9/2000 | Fujitani et al. | 369/47.4 |
| 6,131,166 A | 10/2000 | Wong-Insley | 713/300 |
| 6,138,232 A | 10/2000 | Shiell et al. | 712/244 |
| 6,158,012 A * | 12/2000 | Watts, Jr. | 713/322 |
| 6,163,721 A | 12/2000 | Thompson | 607/2 |
| 6,173,409 B1 | 1/2001 | Watts, Jr. et al. | 713/322 |
| 6,201,371 B1 | 3/2001 | Kawabe et al. | 320/121 |
| 6,266,776 B1 | 7/2001 | Sakai | 713/300 |
| 6,269,043 B1 | 7/2001 | Batcher | 365/227 |
| 6,282,661 B1 | 8/2001 | Nicol | 713/300 |
| 6,298,448 B1 | 10/2001 | Shaffer et al. | 713/322 |
| 6,304,761 B1 | 10/2001 | Tsunehiro | 340/7.32 |
| 6,304,978 B1 | 10/2001 | Horigan et al. | 713/322 |
| 6,311,287 B1 | 10/2001 | Dischler et al. | 713/601 |
| 6,340,874 B1 | 1/2002 | Vladimir | 318/471 |
| 6,356,615 B1 | 3/2002 | Coon et al. | 377/16 |
| 6,363,491 B1 | 3/2002 | Endo | 713/310 |
| 6,367,023 B1 | 4/2002 | Kling et al. | 713/340 |
| 6,407,689 B1 | 6/2002 | Bazarjani et al. | 341/143 |
| 6,425,068 B1 | 7/2002 | Vorbach et al. | 712/18 |
| 6,427,211 B1 | 7/2002 | Watts, Jr. | 713/320 |
| 2001/0001880 A1 | 5/2001 | Watts, Jr. | 713/322 |
| 2001/0005892 A1 | 6/2001 | Watts, Jr. et al. | 713/300 |
| 2001/0044909 A1 | 11/2001 | Oh et al. | 713/600 |
| 2002/0004915 A1 | 1/2002 | Fung | 713/320 |
| 2002/0029353 A1 | 3/2002 | Hwang | 713/322 |
| 2002/0032535 A1* | 3/2002 | Alexander et al. | 702/64 |
| 2003/0020421 A1* | 1/2003 | Vu et al. | 318/442 |
| 2003/0158677 A1* | 8/2003 | Swarztrauber et al. | 702/62 |

FOREIGN PATENT DOCUMENTS

| | | |
|---|---|---|
| EP | 0712064 | 5/1996 |
| JP | 11338744 | 12/1999 |
| WO | WO/0153921 | 7/2001 |

* cited by examiner

METHOD AND APPARATUS FOR OPTIMIZING PERFORMANCE AND BATTERY LIFE OF ELECTRONIC DEVICES BASED ON SYSTEM AND APPLICATION PARAMETERS

CROSS-REFERENCE TO RELATED APPLICATIONS

This application claims priority to U.S. Provisional Patent Application Ser. No. 60/333,535, entitled "Performance and Battery Life Optimization Based on System and Application Parameters" and filed Oct. 11, 2001, the disclosure of which is incorporated herein by reference in its entirety.

BACKGROUND OF THE INVENTION

1. Field of the Invention

The present invention relates to processing systems or devices and, more particularly, to adjustment of power used during operation of those devices.

2. Discussion of the Related Art

Portable and autonomously powered electronic devices (e.g., computer systems, telephones, PDAs, etc.) are becoming more and more sophisticated, while at the same time, becoming smaller. These devices, whether powered by batteries, fuel cells, solar power, or some other power source, are capable of performing functions that have been traditionally relegated to large desktop and server computer systems.

While the technology for portable electronic devices has progressed rapidly, improvements in battery capacity and energy density have not been as rapid. As a result, a gap has developed between the processing capabilities of portable electronic devices and the battery life of those devices. This gap has constrained the "autonomy" of portable electronic devices, reducing the amount of time between battery recharge or replacement, and thus limiting the true portability of these devices. Often, designers of portable electronic devices must delicately balance battery parameters such as size, weight, and cost against the portability and operational characteristics of the device.

In an attempt to overcome these problems, computer electronics manufacturers have incorporated many features into their hardware and software designs to extend battery life. A feature that has been introduced is frequency and voltage adjustment for microprocessors. Various companies, such as Intel, IBM, Texas Instruments, Motorola, and Transmeta, have introduced microprocessors that include the run-time capability to increase or decrease the frequency and voltage at which the microprocessor core operates. Since power consumption is directly proportional to the clock frequency of the microprocessor and to the square of the corresponding applied voltage, reductions in both parameters can have a cubic effect on overall power consumption of the device. However, reducing clock frequency may also reduce instruction-processing performance.

The related art provides several practices of understanding performance appropriately and adjusting performance in attempt to overcome this problem. For example, when activity of a computer system is below a threshold for a certain period of time, hardware components of the computer system are shut off or deactivated to conserve power. By way of example, a display backlight may be turned off or the computer system itself may be disabled in response to a user not providing any input to the computer system for several minutes. Alternatively, the microprocessor core may be placed in a non-processing low-power state with the clock stopped. Examples of such approaches are disclosed in U.S. Pat. Nos. 5,386,577, 5,493,685, 5,983,357 and/or 5,991,883, the disclosures of which are incorporated herein by reference in their entireties.

Further, the clock frequency of a microprocessor may be reduced when activity of a computer system is below a threshold for a certain period of time, and subsequently increased in response to increased computer system activity. Examples of such approaches are disclosed in U.S. Pat. Nos. 5,369,771, 5,628,001, 5,752,011 and/or 5,983,357, the disclosures of which are incorporated herein by reference in their entireties.

In addition, the types of activities that a computer system performs may be monitored to determine whether clock frequency and voltage are to be reduced or increased. Examples of such approaches are disclosed in U.S. Pat. Nos. 5,504,908, 5,625,826, 5,892,959, 5,996,084 and/or 6,427,211, the disclosures of which are incorporated herein by reference in their entireties.

The related art suffers from several disadvantages. In particular, the related art techniques provide some straightforward capabilities to reduce power consumption through various optimizations; however, the power reduction achieved is limited. Further, the related art techniques monitor individual or a few basic parameters to reduce power, thereby providing a simplistic approach that may enter a power conserving state at an inopportune time and consequently adversely affect performance.

The present invention overcomes the aforementioned problems and provides several advantages. In particular, the present invention significantly reduces power consumption (effectively increasing battery life by a factor of two or more), while not appreciably affecting electronic device performance. These power consumption reductions are achieved through a combination of optimizations, aggregated together and analyzed over plural time-periods. The optimizations are based on very low-level system parameters related to the microprocessor hardware and operating system software, and high-level parameters related to the application and end-user operating environment.

OBJECTS AND SUMMARY OF THE INVENTION

Accordingly, it is an object of the present invention to significantly reduce the power consumption of electronic devices, thereby extending device operating life.

It is another object of the present invention to adjust operating frequency and/or voltage of an electronic device in accordance with an analysis of individual or a combination of one or more low-level parameters, such as instructions-per-cycle, thread zones, and/or interrupt density.

Yet another object of the present invention is to adjust operating frequency and/or voltage of an electronic device in accordance with an analysis of individual or a combination of one or more environmental parameters, such as weather conditions, physical location, orientation, motion, time-of-day and/or received wireless radio signal strength.

Still another object of the present invention is to adjust operating frequency and/or voltage of an electronic device in accordance with an analysis of the above-mentioned parameters conducted in one or more of the following manners: analysis of the parameters over plural time-periods (e.g., including current and historical periods); the time-periods being of equal duration (e.g., fixed sampling rate) or of variable duration (e.g., based on factors such as operating system task/thread switches or interrupt arrival); and/or analysis of plural parameters simultaneously, with each parameter providing a fixed or adjustable scaling or voting factor in determining if a specified power-saving threshold is achieved.

The aforesaid objects may be achieved individually and/or in combination, and it is not intended that the present invention be construed as requiring two or more of the objects to be combined unless expressly required by the claims attached hereto.

According to the present invention, an electronic device (e.g., computer system, etc.) adjusts power consumption in accordance with an analysis of parameters and events occurring over one or more time-periods. Preferably, the electronic device monitors microprocessor, operating system, peripheral and/or device-level events and adjusts run-time parameters, such as microprocessor clock frequency and voltage, to reduce power consumption with minimal perceived degradation in performance.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
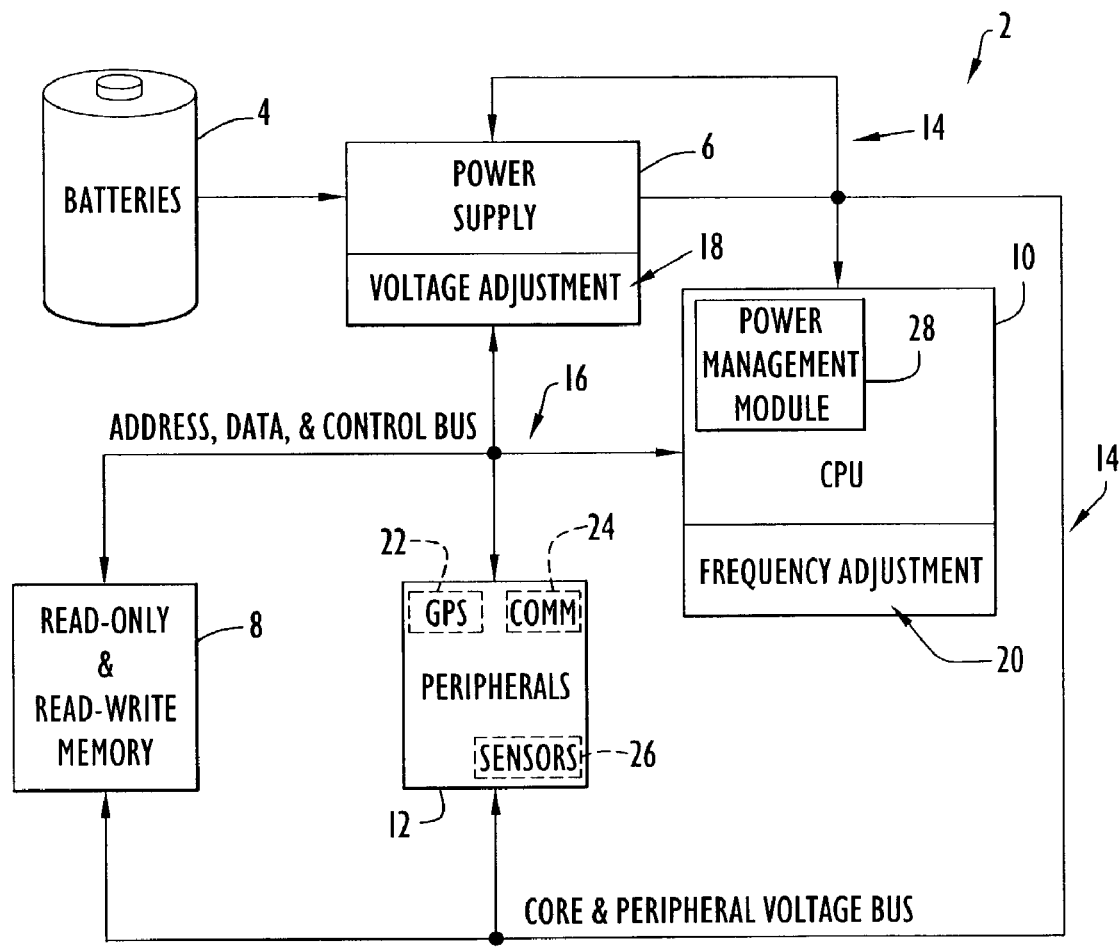
FIG. 1 is a block diagram of an exemplary computer system employing the dynamic power management of the present invention.

An exemplary computer system employing the dynamic power management of the present invention is illustrated in FIG. 1. By way of example, the present invention is described with respect to a computer system; however, the present invention may be employed by any electronic device including a processing system or processor to reduce power consumption by that device. Specifically, computer system 2 includes a power source or batteries 4, a power supply 6, memories 8, a processor or CPU 10 and peripherals 12. The power supply receives power from batteries 4 and provides appropriate power signals to the various computer system components (e.g., memories 8, processor 10, peripherals 12, etc.) via a power bus 14. The power supply is typically implemented by a conventional power supply and includes a voltage adjustment module 18 (e.g., in the form of hardware (such as circuitry) and/or software) to control the voltage provided by that supply. Processor 10 is typically implemented by a conventional microprocessor (e.g., Intel StrongARM or the like, etc.) including a frequency adjustment module 20 (e.g., in the form of hardware (such as circuitry) and/or software). The frequency adjustment module controls the processor clock rate or frequency.

Memories 8 include the read-only and read-write memories of the computer system (e.g., ROM, RAM, etc.). These memories are typically implemented by conventional components. Peripherals 12 may include various communications or other devices. By way of example, peripherals 12 may include a Global Positioning System (GPS) receiver 22, a communications device or link 24 (e.g., modem, etc.) and/or sensors 26 (e.g., temperature sensors, humidity sensors, etc.). Receiver 22 and link 24 interface external devices (e.g., GPS system, network, Internet, etc.) to receive parameter or other information, while sensors 26 produce parameter measurements. The parameter information and measurements are utilized for power management determinations as described below. The processor communicates with the power supply, memories and peripherals via an information bus 16. The various computer system components (e.g., memories, power supply, processor, peripherals, buses, etc.) are typically implemented by conventional components and/or devices, where their configurations may vary slightly to accommodate particular characteristics of a device. For example, the clock frequency and voltage adjustment modules may be integrated within the processor and power supply or be implemented as external modules.

The processor includes a power management module 28 to monitor various device and/or external parameters and facilitate adjustment of the processor clock frequency and voltage to conserve power in accordance with the present invention as described below. The power management module is typically implemented as a software module or unit executable by processor 10; however, this module may be implemented as a hardware module or unit (e.g., circuitry) or as any combination of hardware and software, and may be external of or integral with the processor. The power management module provides control signals to adjust the processor clock rate and voltage. Frequency adjustment module 20 adjusts the processor clock rate in accordance with the control signals, while the processor communicates with voltage adjustment module 18 to adjust the power supply voltage in accordance with these signals. The power management module typically accesses peripherals 12 and memories 8 to store and receive parameter information for power management determinations as described below. Parameter information may be stored in memories 8 for several parameter sampling intervals, thereby enabling power management determinations based on current parameter measurements and a history of these measurements as described below. In addition, memories 8 include available frequency and voltage settings for the processor and power supply to facilitate adjustment of the clock frequency and voltage as described below. These settings may be stored in the memories in any desired fashion (e.g., list, stack, queue, array, etc.).

Figure 2:
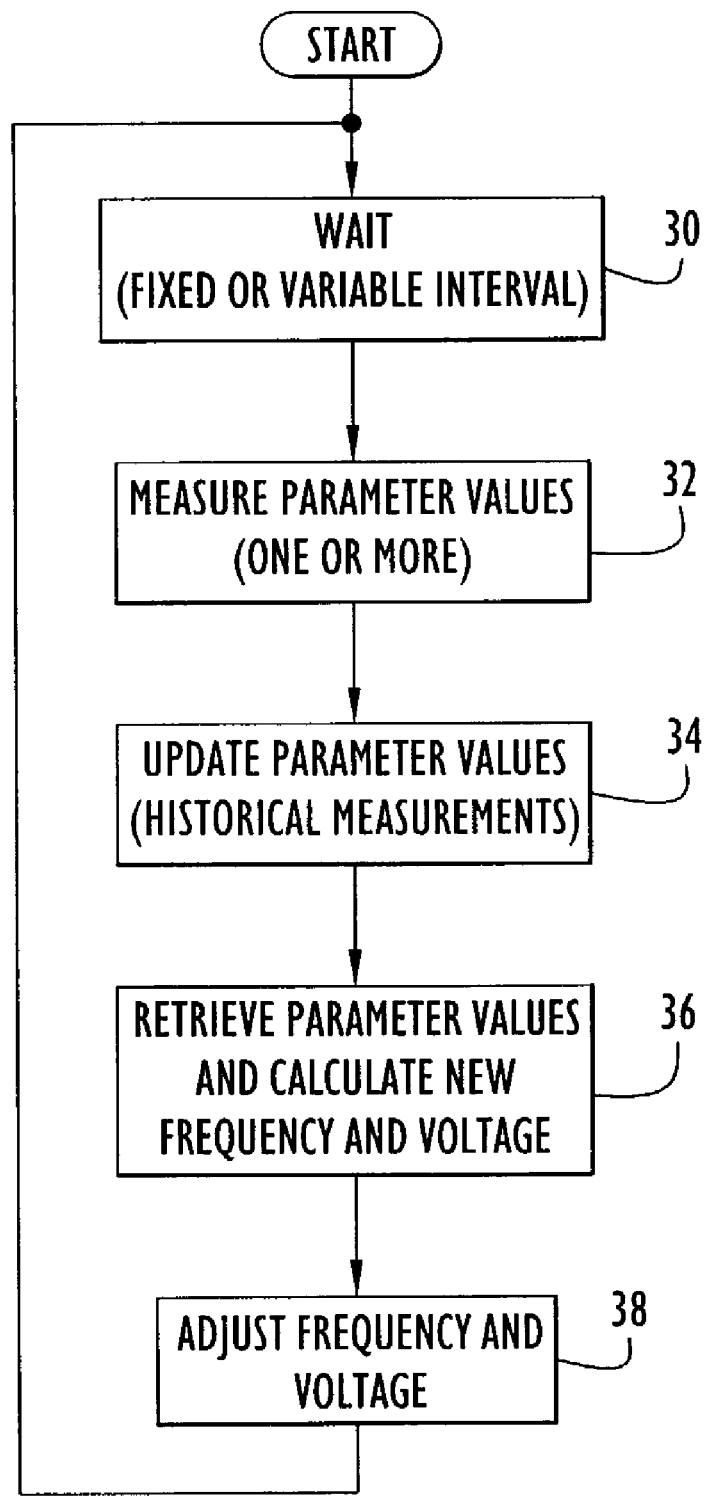
FIG. 2 is a procedural flow chart illustrating the manner in which dynamic power management is accomplished in accordance with the present invention.

The power management module basically facilitates measurement and storage of parameters within a parameter sampling interval, and examines those parameters to adjust the processor clock rate and voltage accordingly. The manner in which dynamic power management is performed by power management module 28 is illustrated in FIG. 2.

Initially, the power management module waits for the beginning of a parameter sampling interval at step 30. This interval may be fixed (e.g., occurs at a prescribed interval, such as every one millisecond) or variable (e.g., based on system activity, such as interrupts) as described below. The power management module basically monitors a timer or system activity to determine the occurrence of a fixed or variable interval, respectively. Once a parameter sampling interval commences, the power management module facilitates measurement of one or more parameters during that interval at step 32. The measured parameter values are stored in memories 8 at step 34. Current measured values for a parameter may be stored in a queue or other data structure with prior values for that parameter to provide a parameter history for power management determinations as described below. The stored measurement values are retrieved to determine a new processor clock frequency and voltage at step 36. Basically, the parameter values are utilized to select one of the series of available frequency and voltage settings stored in memories 8 (FIG. 1). These memories typically contain appropriate frequency and corresponding voltage settings for the particular device as described above. The selected settings are applied to power supply 6 and processor 10 at step 38 to adjust the voltage and clock frequency, respectively. Generally, greater power is required to operate the processor at a higher frequency. Accordingly, the power management module typically adjusts the voltage prior to the frequency for a frequency increase, and adjusts the frequency prior to the voltage for a frequency reduction. This prevents the situation where the processor is operating at a high frequency with low voltage. The frequency and voltage values determined in a parameter sampling interval are maintained until the next interval.

Power management module 28 may utilize various parameters to determine appropriate frequency and voltage settings, but preferably determines the settings in accordance with the number of instructions-per-cycle (IPC). Instructions-per-cycle is basically determined by counting the number of instructions executed by the processor and the number of clock frequency cycles that occur during a time interval (e.g., parameter sampling interval, desired time interval, etc.) and dividing the instruction count by the cycle count. The number of cycles and instructions executed are typically determined by and retrieved from the processor. The IPC parameter is indicative of system performance and the type of activities that are occurring as described below, and may further be determined relative to any desired unit time other than a processor clock cycle (e.g., instructions per millisecond or other time interval, etc.).

In modern microprocessors, deep pipelining is used to theoretically allow one machine language instruction to be completed for every microprocessor clock cycle, thereby resulting in an IPC of 1.0. IPC typically falls below 1.0 due to factors that cause a slowdown in the execution of instructions. These factors may include system inactivity (idle time), off-chip accesses to memory for cache-line fills and variables, off-chip accesses to peripherals, and pipeline stalls. IPC may be utilized to determine the effect of a reduction of clock frequency and voltage on system performance. For example, when IPC is near 1.0, the system is typically executing tight instruction loops from within the cache. In this case, clock frequency and voltage should generally be increased to allow the instructions to be executed faster. As IPC falls below 1.0, the system is either idling (e.g., not executing instructions) for portions of the time interval (e.g., parameter sampling interval, etc.) or is performing lots of memory or peripheral accesses, which are typically slow relative to the clock frequency. In these cases, clock frequency and voltage should be reduced because the activities will be completed in the time allotted, but power consumption will be reduced.

Figure 3:
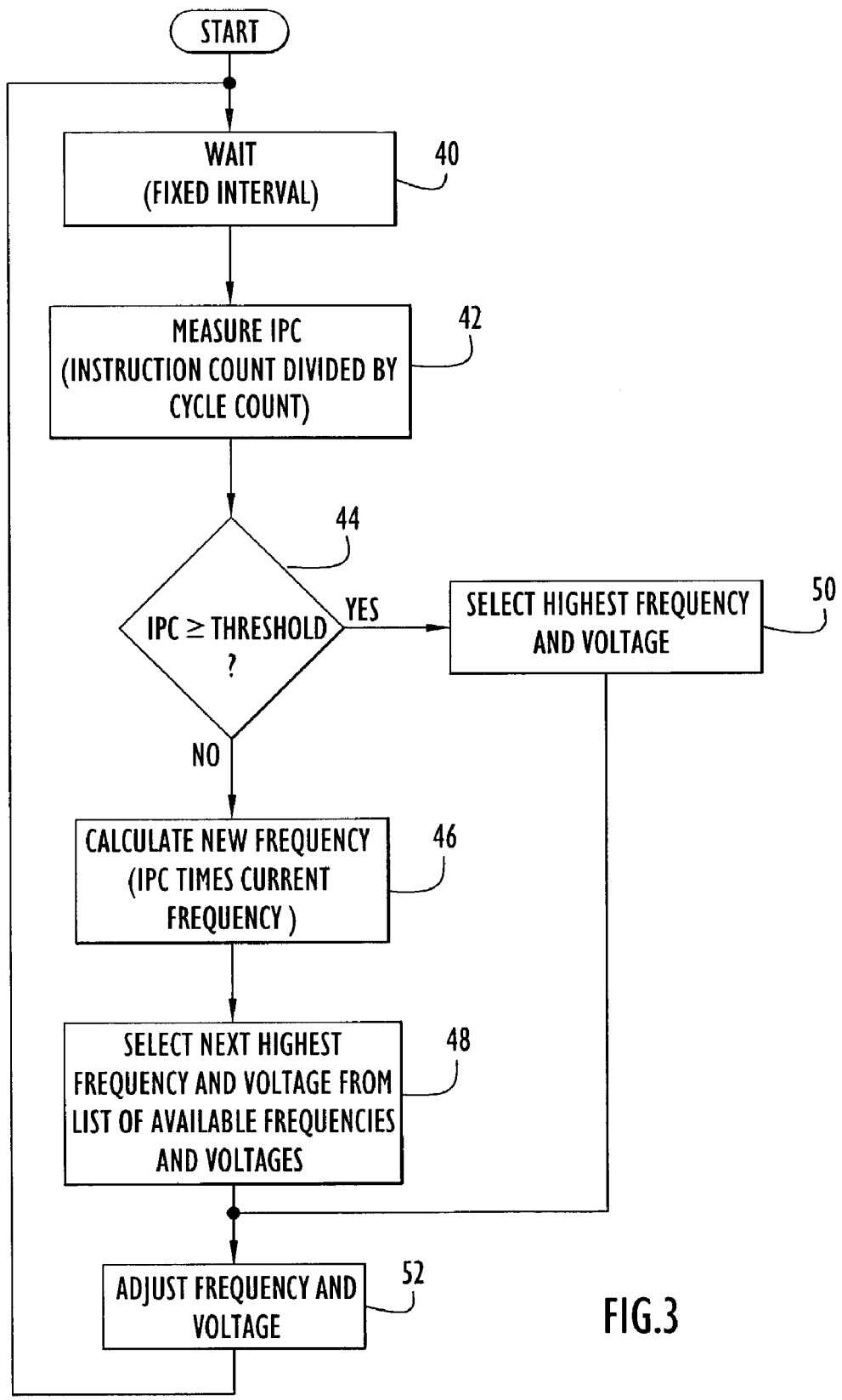
FIG. 3 is a procedural flow chart illustrating the manner in which dynamic power management is achieved based on an instructions-per-cycle (IPC) parameter in accordance with the present invention.

The manner in which power management module 28 utilizes the IPC parameter to control clock frequency and voltage is illustrated in FIG. 3. Initially, the power management module typically waits for the beginning of a parameter sampling interval at step 40 as described above. This interval is typically fixed (e.g., occurs at a prescribed time interval, preferably on the order of milliseconds or microseconds). Once the parameter sampling interval occurs, the instruction and cycle count information is retrieved from the processor to determine the IPC at step 42 as described above. When the IPC is near 1.0, the processor is constantly occupied with code execution, thereby enabling an increase in clock frequency to increase performance and potentially reduce future bandwidth requirements. If, however, the IPC is moderately less than 1.0, the processor is not fully utilized (e.g., due to idle time, cache misses, etc.) and a reduction in frequency increases IPC, without degradation of performance (provided that the IPC does not reach 1.0). Accordingly, the IPC parameter is compared to a threshold that is set to be slightly less than 1.0, typically in the range between 0.95–0.99 (e.g., threshold=1.0–$\Delta$, where $\Delta$ is predetermined or set by a user). As discussed above, when IPC is 1.0, the processor is operating efficiently and an increased clock frequency should be employed. Generally, the IPC parameter is less than 1.0 since the processor usually performs an operation in a given interval that endures for several cycles. The threshold accounts for these instances and basically adjusts sensitivity of the power management module with respect to entering a high performance mode (e.g., increased clock frequency). Thus, the selection of the delta value sets the power management module sensitivity and essentially enables a trade-off between performance and battery life (e.g., the lower the delta value, the longer the battery life and the lower the performance).

When the IPC is greater than or equal to the threshold as determined at step 44, the IPC parameter indicates efficient processor operation and the frequency and voltage are set to the highest frequency and corresponding voltage setting stored in memories 8 (FIG. 1) at step 50. These settings are subsequently applied at step 52 to adjust the clock frequency and voltage. Otherwise (e.g., IPC is less than the threshold), the new frequency is determined by multiplying the IPC by the current frequency setting at step 46. The next highest frequency (relative to the new frequency) within the stored frequency values is selected and the frequency and corresponding voltage setting are retrieved from the stored values at step 48. The new settings are subsequently applied at step 50 to adjust the clock frequency and voltage. The current IPC value multiplied by the current frequency setting produces a frequency yielding a theoretical IPC of 1.0. The selection of the next highest frequency value setting impedes the IPC from attaining a value of 1.0.

By way of example, a processor includes four frequency settings (e.g., 100, 200, 300, and 400 MHz). If the current frequency is 400 MHz and the measured IPC is 0.60, the new frequency should be the next highest possible setting above 240 MHz (e.g., 0.6×400=240 MHz), or 300 MHz. In this case, assuming the processor maintains the same execution profile for the next parameter sampling interval, the IPC value is 0.80, and the calculation indicates that the frequency should remain at 300 MHz. Eventually, the IPC value may be 0.60, indicating that the frequency should be adjusted down to 200 MHz, or alternatively, the IPC may be 1.0, indicating that the frequency is to be set to the maximum of 400 MHz.

Figure 4:
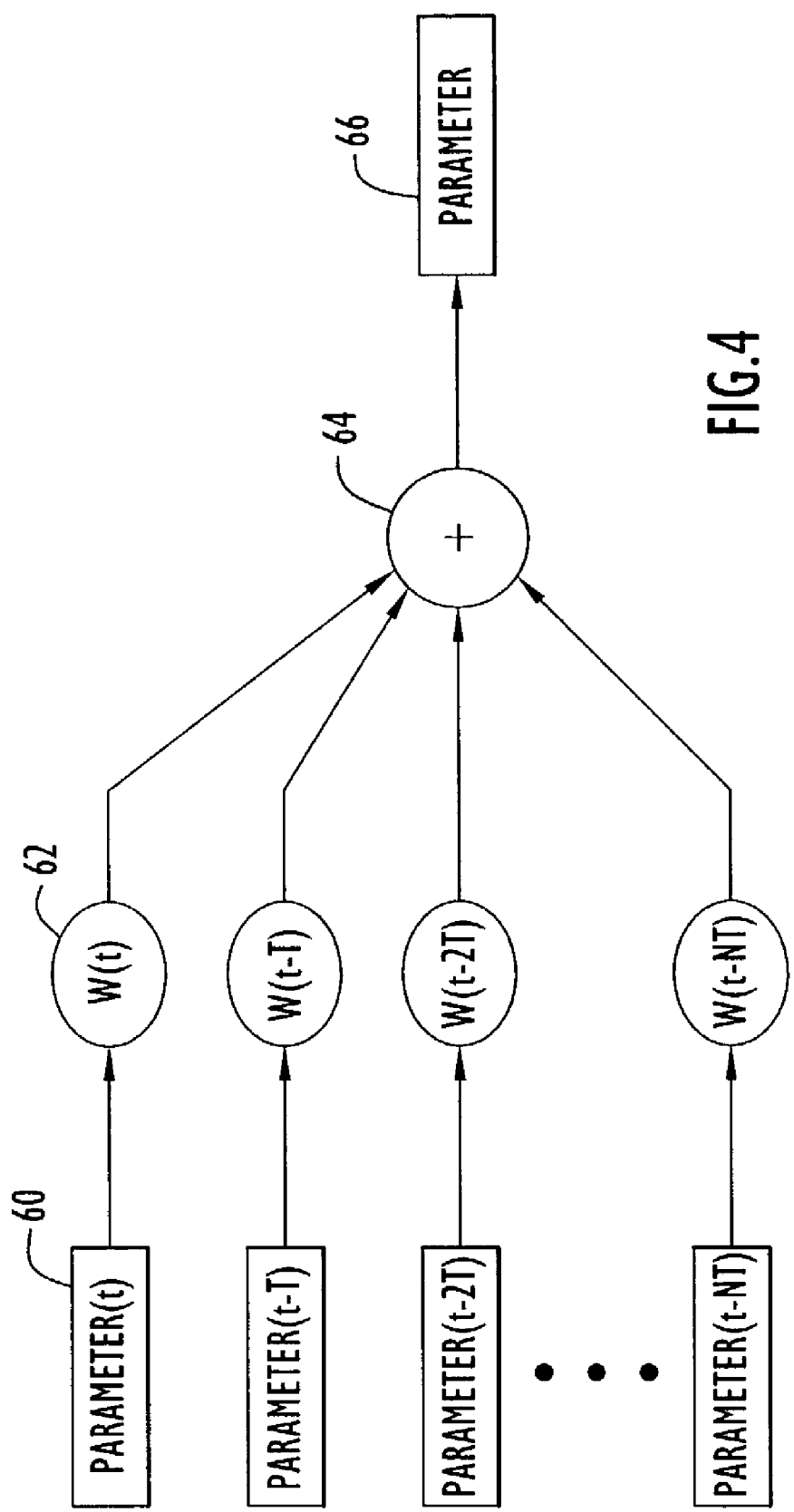
FIG. 4 is a functional block diagram illustrating the manner in which values for a parameter are combined over plural time-periods for power management determinations in accordance with the present invention.

The power management module may alternatively employ historical filtering to derive more accurate IPC or other parameter values as illustrated in FIG. 4. In particular, measured values for a parameter 60, such as IPC, are retrieved from memories 8. The parameter values for plural parameter sampling intervals are typically stored in memories 8 in a circular buffer or queue of length N, where N is the number of samples of the parameter to include in the filter and a new parameter value measurement is stored in the position of the least-recent parameter value measurement. The parameter values may be stored for any desired quantity of parameter sampling intervals, where t represents a current time and T represents a parameter sampling interval. Thus, the expression 'parameter (t−NT)' represents a measurement from N prior parameter sampling intervals. The retrieved parameters are each multiplied by a corresponding weight 62 and applied to a summer 64. The summer produces a resulting parameter value 66 that is basically a summation of the weighted parameter values. The resulting value is subsequently utilized as an overall value for the parameter (e.g., IPC) to determine clock frequency and voltage adjustments (e.g., in the manner described above for FIG. 3). Thus, the filtering is generally a weighted average, where the most recent parameter values may be given more weight than older prior values based on the corresponding weights. The effect of recent values may be diminished by adjusting the filter weights accordingly. In this way, rapid fluctuations of parameter values can be "smoothed" or averaged out, as appropriate, and alternatively, periodic features of the parameter values can be reduced or emphasized.

The parameter sampling intervals of the present invention may be in the form of asynchronous time intervals for measurements. Basically, fixed intervals at high rates (e.g., frequent sampling intervals) can have the effect of overtaxing the computer or processing system. Accordingly, the processor may be interrupted at normal interrupt intervals for frequency and voltage determinations. These determinations are basically performed at each activity driven interrupt (e.g., key press, touchscreen touch, etc.). The result is an asynchronous sampling interval that, in certain cases, reduces computational requirements.

Figure 5:
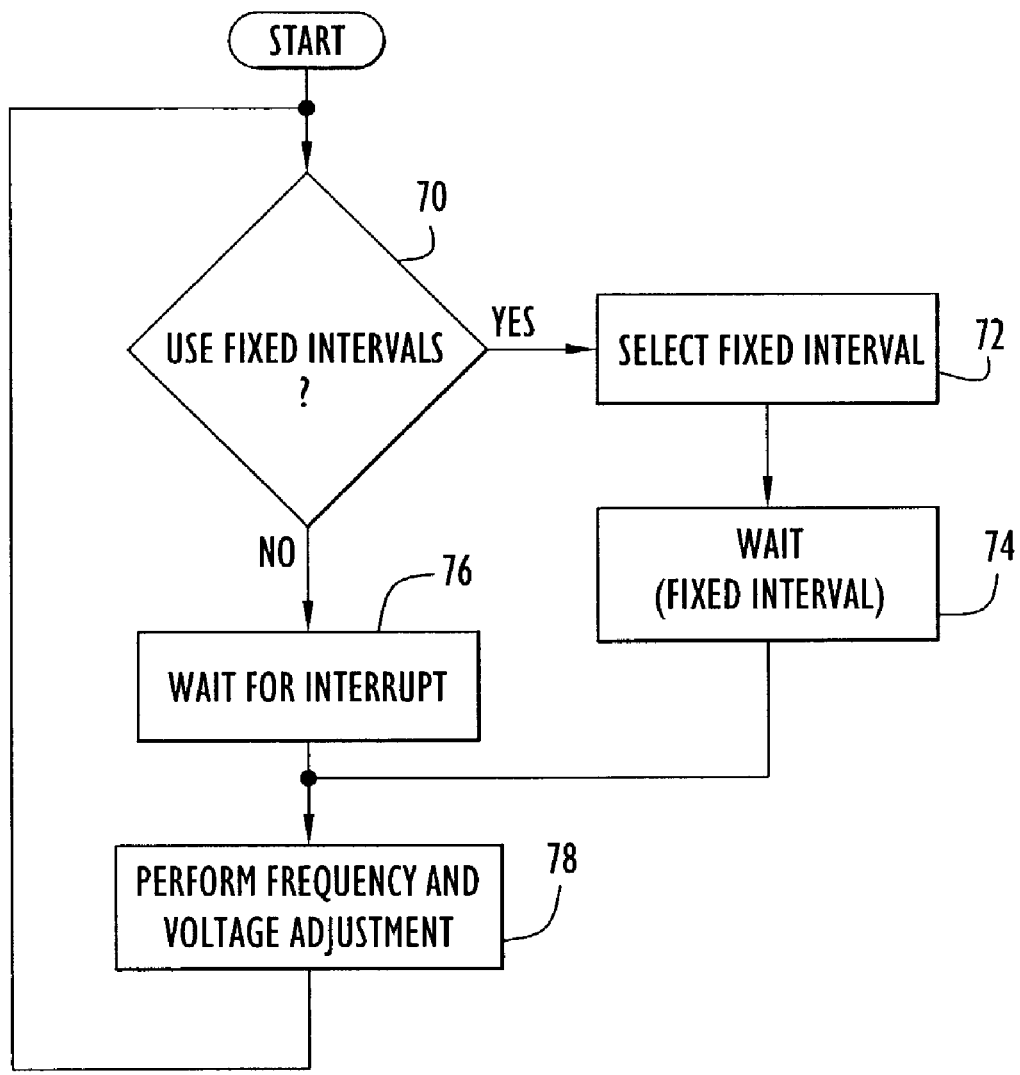
FIG. 5 is a procedural flow chart illustrating the manner in which an interval type is selected for performing parameter measurements in accordance with the present invention.

The manner in which the power management module employs the various types of intervals (e.g., fixed and variable) is illustrated in FIG. 5. Specifically, the power management module determines if fixed intervals are to be employed at step 70. This may be accomplished based on various factors, such as user or OEM settings, the parameter to measure, the processor activity, etc. If a fixed interval is to be employed, the power management module selects the appropriate interval at step 72, and waits for the occurrence of that interval to perform clock frequency and voltage adjustment at step 78 as described above (e.g., FIG. 2). Otherwise, the power management module employs a variable interval (e.g., based on interrupts or other system activity) and waits for the occurrence of that interval at step 76 to perform clock frequency and voltage adjustment at step 78 as described above (e.g., FIG. 2).

Figure 6:
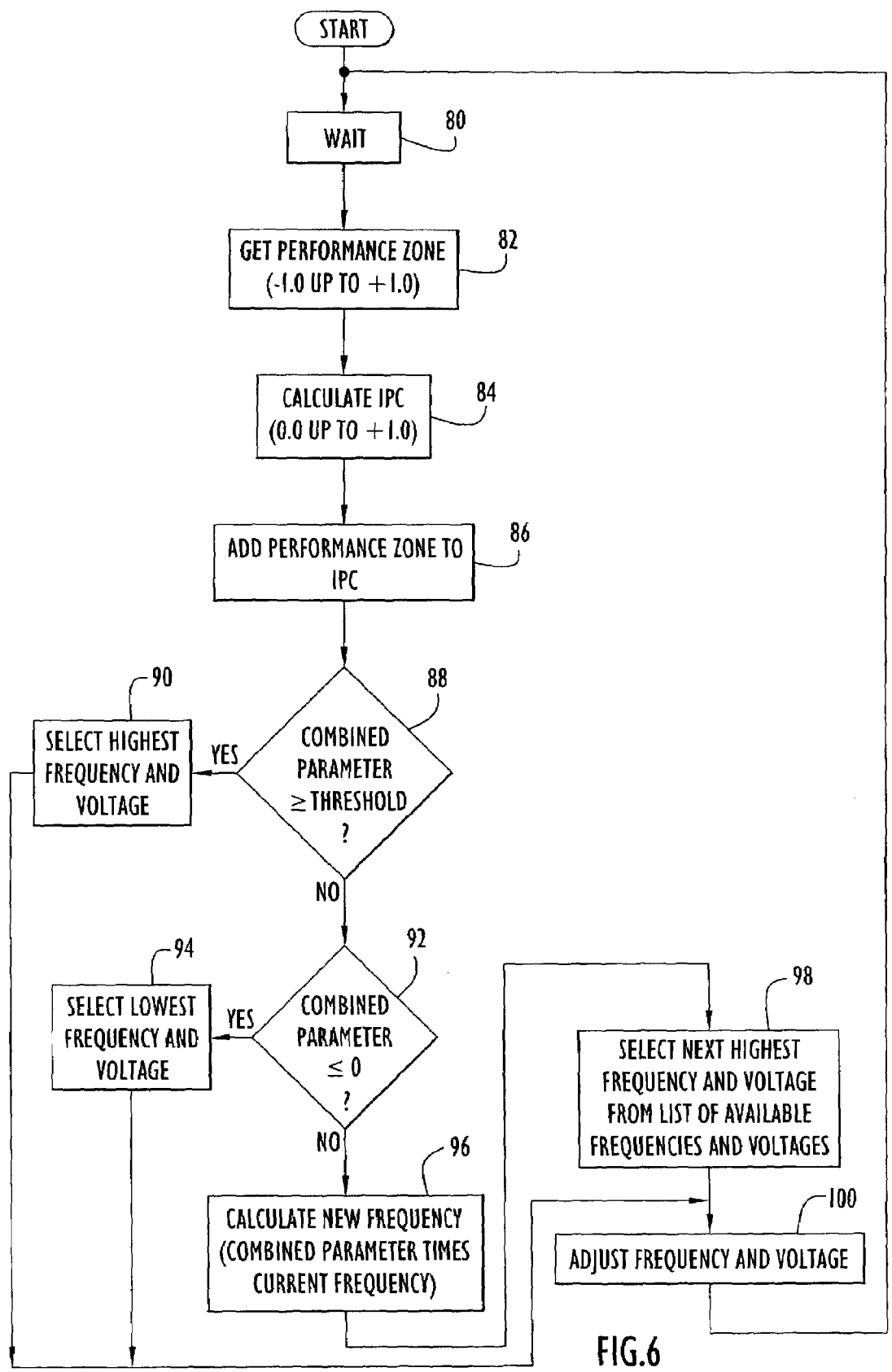
FIG. 6 is a procedural flowchart illustrating the manner in which plural parameters are combined in a series of stages for power management determinations in accordance with the present invention.

The power management module may further utilize various parameters to adjust clock frequency and voltage. The parameters may be used individually as described above (e.g., for IPC), or may be combined in plural stages to determine clock frequency and voltage settings. The manner in which the power management module combines parameters in plural stages to determine clock frequency and voltage settings is illustrated in FIG. 6. Initially, the power management module is described with reference to combining thread performance zone and IPC parameters. However, the power management module may combine any desired parameters in the manner described below. The thread performance zone parameter represents a request for a particular performance level by a software thread or task executing on processor 10. This request may be provided by software (e.g., through an application programming interface or function call within the task) or hardware (e.g., via a register that stores a circuit-determined performance value based on task information). The request is presented in the form of a numerical value that represents a range from low performance to high performance. For example, the range from −1.0 to +1.0 includes −1.0 indicating lowest performance (e.g., longest battery life), 0.0 indicating average performance, and +1.0 indicating highest performance (e.g., shortest battery life). The selected default value is typically in the middle of that range (e.g., zero).

In particular, the power management module waits for a parameter sampling interval (e.g., fixed or variable) at step 80. Once the interval occurs, the performance zone parameter is retrieved at step 82 (e.g., the retrieval of the performance zone parameter represents an initial stage). Subsequently, the IPC parameter is determined at step 84 in the manner described above and added to the performance zone parameter at step 86 (e.g., this represents a subsequent stage). The net effect of the addition is to skew the IPC value towards low or high performance based on the requested performance zone. The resulting combined parameter is subsequently compared to a threshold. The threshold value is typically set to be slightly less than 1.0, typically in the range between 0.95–0.99 (e.g., threshold=1.0−Δ, where Δ is predetermined or set by a user). As discussed above, when IPC is near 1.0, the processor is operating efficiently and the highest operating frequency is utilized. Generally, the IPC parameter is typically less than 1.0 since the processor usually performs an operation in a given interval that endures for several cycles. Accordingly, the threshold accounts for these instances, and basically adjusts sensitivity of the power management module with respect to entering a high performance mode. Thus, the selection of the delta value sets the power management module sensitivity and essentially enables a trade-off between performance and battery life (e.g., the lower the delta value, the longer the battery life and the lower the performance).

When the resulting combined parameter is greater than or equal to the threshold as determined at step 88, the IPC and performance zone parameters are indicating a high performance mode and the highest frequency and corresponding voltage setting stored in memories 8 are selected at step 90 and applied at step 100 to adjust the frequency and voltage. If the combined parameter value is less than zero as determined at step 92, the IPC and performance zone parameters are indicating a power conservation mode and the lowest frequency and corresponding voltage setting stored in memories 8 are selected at step 94 and applied at step 100 to adjust the frequency and voltage. When the combined parameter is greater than zero and less than the threshold, a new frequency is determined at step 96 by multiplying the combined parameter by the current frequency. The next highest frequency within the stored frequency values is selected and the corresponding frequency and voltage settings are retrieved at step 98 and applied at step 100 to adjust the frequency and voltage. Thus, when the performance zone is 0.0, no effect is added and the IPC value and the current frequency value determines the new frequency value as described above. However, if the performance zone is less than or greater than 0.0, the effective IPC value is decreased or increased, causing the new frequency to skew towards lower or higher frequencies, respectively. By way of example, a processor has possible frequency settings of 100, 200, 300, and 400 MHz. With an IPC of 0.6, current frequency of 400 MHz and a performance zone of 0.0, the appropriate new frequency is 300 MHz (e.g., the next highest possible frequency value above 0.6 multiplied by 400). However, if the performance zone is −0.2, the appropriate new frequency is 200 MHz (the next highest frequency value above 0.4 multiplied by 400), while a performance zone of +0.3 maintains the frequency at 400 MHz.

The effect of or the amount of skewing by the parameters on the frequency and voltage adjustment in the plural stages may be controlled. For example, if the effect of the first stage parameter (e.g., performance zone) is to be lower relative to the second stage parameter (e.g., IPC), the range for the first parameter may be lowered (e.g., −0.5 to +0.5, instead of −1.0 to +1.0) with respect to the second parameter range. In addition, plural parameters each with a corresponding value range may be used in the first stage to skew the second stage parameter towards higher or lower frequencies. By way of example, the first stage may include two parameters, one with a range of −0.5 to +0.5 and the other with a range of −0.2 to +0.2, where the values of each of the first stage parameters are added or otherwise combined with the second stage parameter for power management determinations as described above. The plural parameters employed by the power management module may include: location, orientation, and motion of the device; interrupt-service-routines-per-cycle (ISRPC); weather/environmental conditions; wireless signal strength; and time-of-day, week, month, or year.

The plural parameters may be used individually or in any combination in stage one to skew the IPC calculation or other parameter in the subsequent stage. The device location, orientation, and motion information may be retrieved from GPS receiver 22 (FIG. 1) receiving information from a GPS system, or over a wired or wireless communications link to a network (e.g., Internet, etc.) or other source via communications device 24. These attributes are formulated as a normalized range, typically centered around 0.0. In the case of location, the parameter reflects distance from a particular location. For example, the most negative value may indicate long distances from the location, while values may increase as the device approaches that location. This has the effect of increasing performance of the device as it approaches the location. Alternatively, performance may be decreased as the location is approached, or modified in accordance with device orientation or acceleration changes.

The ISRPC value is determined by counting the number of interrupts (e.g., typically provided by processor 10) in an interval (e.g., parameter sampling interval) and dividing the count by the time interval, and further dividing the result by the clock frequency (e.g., (count/time interval)/clock frequency). However, any desired unit time interval (e.g., a desired interval, such as one millisecond, etc.) other than the clock frequency may be employed. The resulting number provides an indication of performance requirements. A higher number indicates more interrupts and generally higher processing requirements. The ISRPC value is expressed as a normalized range, typically centered around 0.0. For example, numbers greater than zero may indicate a great number of interrupts, while numbers near or below zero may indicate a small amount of interrupts.

The weather and environmental conditions and the ambient conditions in the environment around the device may be received from on-board sensors 26 (FIG. 1) (e.g., temperature sensors, humidity sensors, etc.) or from a wired or wireless communications link to a network (e.g., Internet, etc.) or other source via communications device 24. These attributes are formulated as a normalized range, typically centered around 0.0. For example, in the case of humidity, humidity measurements relative to a default measurement are utilized to indicate normalized values. High humidity may indicate the most negative value, while low humidity may indicate the most positive value. This has the effect of increasing performance as humidity drops. Alternatively, adjustment of performance may be based on ambient temperature or rainfall.

The relative strength of a received wireless signal (e.g., for use with wireless modems, telephones, etc.) may be used to adjust performance. The signal may be from a local wireless link, such as a cellular telephone system, an 802.11 wireless local area network or a GPS signal. In this case, the attributes are formulated as a normalized range, typically centered around 0.0. For example, as the received radio frequency signal strength increases, this may indicate that the device is approaching an area of expected increased performance, and a value above 0.0 may be set. Alternatively, as the signal strength diminishes, the value may be set below 0.0.

The actual time and date may be used to determine performance. For example, in a distributed smart sensor computer device that measures temperature every hour per day on the hour, as the measurement time approaches, the frequency and voltage may be increased by creating a normalized parameter, typically centered around 0.0, that increases above 0.0 when the time for a measurement approaches. Alternatively, the time and date information may be retrieved via an on-board real-time-clock circuit or over a wired or wireless communications link to a network (e.g., Internet, etc.) or other source via communications device 24 (FIG. 1).

The plural stage combination of parameters described above may further utilize historical measurements of any one or more of the parameters. Basically, the normalized historical measurements may be weighted and combined (e.g., as described above for FIG. 4) to produce a resulting parameter value. The resulting value may be utilized in the corresponding stage in the manner described above to determine clock frequency and voltage settings.

The power management module may further employ various graphical user interfaces (GUI) or user screens (not shown) to display and receive information from a user. For example, a user or operator may set the thresholds (or delta values) or other parameters via these screens, or select desired parameters to utilize for adjusting clock frequency and voltage. Further, the screens may display any desired information, such as operating mode (e.g., frequency, voltage, general indicator indicating high performance or low power mode, etc.), enabled parameters, etc. Alternatively, this information may be displayed on an operating system screen.

It will be appreciated that the embodiments described above and illustrated in the drawings represent only a few of the many ways of implementing a method and apparatus for optimizing performance and battery life of electronic devices based on system and application parameters.

The present invention may be employed for power reduction on any type of electronic device including a processor or processing circuitry under software control (e.g., computer systems, telephones, PDAs, organizers, programmable or other calculators, etc.). These devices may utilize any quantity of any types of portable or stationary power sources (e.g., portable, wall outlet, batteries, solar, fuel cells, etc.), however the present invention is preferably utilized for extending the operating life of devices with portable power sources.

The computer system employing the present invention may be implemented by any quantity of any personal or other type of computer or processing system (e.g., IBM-compatible, Apple, Macintosh, laptop, palm pilot, microprocessor, etc.). The computer system may include any commercially available operating system (e.g., Windows, OS/2, Unix, Linux, etc.), any commercially available and/or custom software (e.g., communications software, power management module software, etc.) and any types of input devices (e.g., keyboard, mouse, microphone, voice recognition, etc.). The various computer system components (e.g., memories, power supply, processor, peripherals, buses, etc.) are typically implemented by any quantity of conventional components and/or devices, where their configurations may vary slightly to accommodate particular characteristics of a device. The processor may be implemented by any conventional or other microprocessor or processing device (e.g., such as those available from Intel). It is to be understood that the software of the present invention (e.g., power management module, etc.) may be implemented in any desired computer language, and could be developed by one of ordinary skill in the computer and/or programming arts based on the functional description contained herein and the flow charts illustrated in the drawings. Further, any references herein of software performing various functions generally refer to computer systems or processors performing those functions under software control.

The power management module may alternatively be implemented by any quantity of hardware or other processing circuitry (e.g., ASIC, PGA, IC, logic or other circuitry, etc.) and may be integrated within a processor to form a new processor or be external of the processor (e.g., on or external to the processor board) and coupled to the frequency and voltage adjustment modules. The various functions of the power management module may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or algorithms described above and illustrated in the flow charts and drawings may be modified in any manner that accomplishes the functions described herein.

The power management module may be implemented as a separate stand-alone software or hardware module or may be in the form of an embeddable system (e.g., within another system, as an embeddable software component within other software, etc.). The power management module software may be available on a recorded medium (e.g., magnetic or optical mediums, magneto-optic mediums, floppy diskettes, CD-ROM, memory devices, etc.) for use on stand-alone systems or systems connected by a network or other communications medium, and/or may be downloaded (e.g., in the form of carrier waves, packets, etc.) to systems via a network or other communications medium.

The processor may include any quantity of any types of peripherals to ascertain parameter information. The GPS receiver may be implemented by any quantity of conventional or other receivers capable of communicating with a GPS system. The communications device may be implemented by any quantity of any conventional communications devices (e.g., wireless or wired modem, wired or wireless network card, etc.) to interface a network (e.g., Internet, etc.) or other source of information. The sensors may be of any quantity and include any type of conventional or other sensors to measure any quantity of desired parameters (e.g., temperature sensor, humidity sensor, rain sensor, etc.). The peripherals may basically ascertain any desired information for the power management determinations either by accessing an information source or by direct measurement.

The reduction of power may be accomplished by any desired techniques (e.g., adjusting frequency and voltage, disabling power to components, etc.). The control signals to adjust frequency and voltage may be of any quantity, may be in any desired format and may contain any desired information. The power management module may communicate directly with the frequency adjustment and voltage adjustment modules or indirectly via the processor. The frequency and voltage may be adjusted individually or in combination based on parameter determinations, where the parameters may relate solely to voltage or frequency, or to both. The frequency and voltage may be adjusted in any desired order and during the same or different intervals.

The type of intervals may be selected in any desired fashion and based on any conditions (e.g., parameters to be measured, system activity, processing efficiency, user preferences or settings, etc.). The fixed intervals may be set to any desired time intervals (e.g., on the order of milliseconds, microseconds, seconds, etc.). The fixed intervals may be predetermined or set by a user or operator. The variable intervals may be based on any desired system activities (e.g., interrupts, thread or task switching, peripherals, activities indicated by a user or operator, etc.). The power management module may include and/or monitor any quantity of conventional or other devices to monitor the fixed and/or variable intervals (e.g., counters, timers, polling registers, etc.).

The present invention may store and/or utilize parameter samples from any quantity of sampling intervals (e.g., current and previous). Further, any quantity of samples for a parameter may be obtained in a sampling interval, and individual parameters may be measured during each interval or during particular intervals (e.g., every Nth interval, where N is an integer, during intervals triggered by a specific activity, etc.). The parameter values may be stored in memory in any desired fashion (e.g., an array, list, table, etc.). The frequency and voltage settings may be stored in the memories in any desired fashion (e.g., an array, list, table, etc.) and may include any quantity of settings in any desired increments or units. Moreover, the memories may store settings and/or controls for any desired device components to reduce power consumption for those components. The memories may include any quantity of any types of memory (e.g., ROM, RAM, etc.), while the various parameters and settings may be stored in any device internal or external memories.

The IPC may be determined in any desired manner based on any desired unit time interval (e.g., clock cycle, any time interval, such as milliseconds, microseconds, etc.). The instruction and cycle count may be determined by the processor, or may be determined by the power management module (e.g., counting instructions and cycles, calculating the number of cycles based on the clock frequency and sampling interval, etc.). The IPC and other parameters may utilize any desired numeric or other range (e.g., symbols or characters with numeric assignments, etc.). The parameter value may be combined with the current frequency or any reference frequency in any desired manner (e.g., multiplied, added, indicate a multiplier, etc.) to attain a new frequency setting. Further, a new frequency setting may be selected from the stored settings in any desired fashion (e.g., select the next highest or lowest, select a frequency based on an offset or a positional offset (e.g., select the second highest or lowest frequency) from the calculated or a reference frequency, etc.).

Any quantity of current and/or prior measurements for a parameter may be combined (e.g., weighted average, filtered, average, accumulated, etc.) in any fashion to produce an overall result. The weights may be of any desired values to achieve a desired effect of values on the overall parameter value. Any quantity of any types of parameters may be combined in any quantity of stages for power management determinations, where each stage may utilize any quantity or type of parameter. The parameter values may be normalized with respect to any desired value range (e.g., numeric, characters or symbols assigned numeric values, etc.). The parameter ranges may be set to any desired values to control the influence of a parameter in the power management determination. The parameter values may be combined in any fashion (e.g., added, multiplied, etc.). Alternatively, the parameter values may be utilized to select or modify thresholds for entering high performance or power conservation modes. For example, the plural parameters may be utilized to adjust the threshold for IPC values to control entry into high performance or power conservation modes.

The thread performance zone parameter may be indicated by software and/or hardware and may include any desired range to indicate performance. This parameter may request any desired specific operating characteristic of the device (e.g., specific frequency or voltage, etc.). The thread or task may further request any desired characteristic in any desired fashion (e.g., request a device to be disabled, etc.).

The ISRPC may be determined in any desired manner based on any desired unit time interval (e.g., clock cycle, any time interval, such as milliseconds, microseconds, etc.). The interrupt cycle count may be determined by the processor, or may be determined by the power management module (e.g., counting interrupts, etc.). The various plural parameters (e.g., location, motion, weather, etc.) may be obtained from external information sources (e.g., Internet, GPS system, etc.) or direct sensor measurement in any desired fashion.

The GUI or user screens may be of any quantity, may be arranged in any desired fashion and may include any desired information (e.g., indicate mode, enabled parameters, etc.). The screens may receive any information from a user (e.g., frequency, voltage or other system device settings to control the device, parameters to utilize for power management determinations, time for fixed intervals, activity for variable intervals, etc.). The information may alternatively be displayed and/or received from any quantity of screens of other software (e.g., operating system, application program, etc.) or any combination of the user and other software screens.

The techniques described above for examining parameters for power management decisions may be used by the present invention individually, or in any combination to control power usage of the device. Further, each of these techniques may employ fixed or variable intervals or any combinations thereof, and may utilize any desired parameter or combinations of parameters to render power management determinations.

It is to be understood that the present invention is not limited to the applications disclosed herein, but may be utilized with any electronic devices including a processor to reduce device power consumption. Further, the present invention may measure and analyze any desired device or external parameters to reduce device power consumption or control other device operating characteristics.

From the foregoing description, it will be appreciated that the invention makes available a novel method and apparatus for optimizing performance and battery life of electronic devices based on system and application parameters, wherein an electronic device monitors system and application parameters to control device power usage.

Having described preferred embodiments of a new and improved method and apparatus for optimizing performance and battery life of electronic devices based on system and application parameters, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for dynamically managing power within an electronic device comprising:
   a power management device including:
      a sampling module to ascertain and store a plurality of parameter values associated with said electronic device during at least one sampling interval;
      an analysis module to combine said plurality of parameter values to produce an overall parameter value and to evaluate said overall parameter value to determine at least one control value to adjust power consumption of said electronic device in response to said parameter evaluation, wherein said plurality of parameters are arranged into a series of successive stages with each stage including at least one parameter, and said analysis module includes:
         a normalization module to normalize said parameter values relative to a numeric range; and
         a combination module to mathematically combine said normalized parameters of each subordinate stage with a succeeding stage to produce an overall value to determine said at least one control value to adjust said power consumption of said electronic device; and
      an adjustment module to adjust power consumption of said electronic device in accordance with said at least one control value to control electronic device power consumption.

2. The system of claim 1, wherein said sampling module ascertains and stores values for a parameter for a plurality of sampling intervals, and said analysis module includes:
   a history module to determine said at least one control value based on a parameter value from a current sampling interval and at least one parameter value from a prior sampling interval to adjust said power consumption of said electronic device.

3. The system of claim 1, wherein said sampling module selects a type of sampling interval from among a series of sampling interval types in accordance with electronic device conditions, wherein said series of sampling interval types include fixed and variable sampling intervals.

4. The system of claim 3, wherein said selected sampling interval is a fixed sampling interval that occurs periodically at a prescribed time interval.

5. The system of claim 3, wherein said sampling interval is a variable sampling interval that commences in response to occurrence of a particular electronic device activity.

6. The system of claim 5, wherein said electronic device activity includes an activity driven interrupt of an electronic device processor.

7. The system of claim 1, wherein said at least one control value includes at least one of an operating frequency and a power level to utilize for an electronic device component.

8. A system for dynamically managing power within an electronic device comprising:
a power management device including:
a sampling module to ascertain and store a plurality of parameter values associated with said electronic device during at least one sampling interval, wherein said plurality of parameters relates to at least two of: a quantity of instructions executed per time interval for an electronic device processor; an interrupt density for said electronic device processor; a performance request by a thread executing on said electronic device processor; weather and/or environmental conditions; location, orientation and/or motion of said electronic device; a signal strength of a wireless signal received by said electronic device; a time of day; and date information;
an analysis module to determine at least one control value based on said plurality of parameter values to adjust power consumption of said electronic device; and
an adjustment module to adjust power consumption of said electronic device in accordance with said at least one control value to control electronic device power consumption.

9. The system of claim 8, wherein said sampling module selects a type of sampling interval from among a series of sampling interval types in accordance with electronic device conditions, wherein said series of sampling interval types include fixed and variable sampling intervals.

10. The system of claim 9, wherein said selected sampling interval is a fixed sampling interval that occurs periodically at a prescribed time interval.

11. The system of claim 9, wherein said sampling interval is a variable sampling interval that commences in response to occurrence of a particular electronic device activity.

12. The system of claim 11, wherein said electronic device activity includes an activity driven interrupt of an electronic device processor.

13. The system of claim 8, wherein said analysis module includes:
a history module to determine said at least one control value based on a parameter value from a current sampling interval and at least one parameter value from a prior sampling interval to adjust said power consumption of said electronic device.

14. The system of claim 8, wherein said at least one control value includes at least one of an operating frequency and a power level to utilize for an electronic device component.

15. A system for dynamically managing power within an electronic device comprising:
a power management device including:
a sampling module to ascertain and store a plurality of parameter values associated with said electronic device during at least one sampling interval, wherein said sampling module ascertains and stores values for a parameter for a plurality of sampling intervals;
an analysis module to combine said plurality of parameter values to produce an overall parameter value and to evaluate said overall parameter value to determine at least one control value to adjust power consumption of said electronic device in response to said parameter evaluation, wherein said analysis module includes a combination module to combine a parameter value from a current sampling interval with at least one parameter value from a prior sampling interval to produce an overall value to determine said at least one control value to adjust said power consumption of said electronic device, and wherein said combination module includes a parameter module to determine a weighted average of said current parameter value and said at least one prior parameter value to produce said overall value to determine said at least one control value to adjust said power consumption of said electronic device; and
an adjustment module to adjust power consumption of said electronic device in accordance with said at least one control value to control electronic device power consumption.

16. The system of claim 15, wherein said sampling module selects a type of sampling interval from among a series of sampling interval types in accordance with electronic device conditions, wherein said series of sampling interval types include fixed and variable sampling intervals.

17. The system of claim 16, wherein said selected sampling interval is a fixed sampling interval that occurs periodically at a prescribed time interval.

18. The system of claim 16, wherein said sampling interval is a variable sampling interval that commences in response to occurrence of a particular electronic device activity.

19. The system of claim 18, wherein said electronic device activity includes an activity driven interrupt of an electronic device processor.

20. The system of claim 15, wherein said at least one control value includes at least one of an operating frequency and a power level to utilize for an electronic device component.

21. A method of dynamically managing power within an electronic device comprising the steps of:
(a) ascertaining and storing a plurality of parameter values associated with said electronic device during at least one sampling interval;
(b) combining said plurality of parameter values to produce an overall parameter value and evaluating said overall parameter value to determine at least one control value to adjust power consumption of said electronic device in response to said parameter evaluation, wherein said plurality of parameters are arranged into a series of successive stages with each stage including at least one parameter, and step (b) further includes:
normalizing said parameter values relative to a numeric range; and
mathematically combining said normalized parameters of each subordinate stage with a succeeding stage to produce an overall value to determine said at least one control value to adjust said power consumption of said electronic device; and
(c) adjusting power consumption of said electronic device in accordance with said at least one control value to control electronic device power consumption.

22. The method of claim 21, wherein step (a) further includes:

ascertaining and storing values for a parameter for a plurality of sampling intervals; and step (b) further includes:

determining said at least one control value based on a parameter value from a current sampling interval and at least one parameter value from a prior sampling interval to adjust said power consumption of said electronic device.

23. The method of claim 21, wherein step (a) further includes:

selecting a type of sampling interval from among a series of sampling interval types in accordance with electronic device conditions, wherein said series of sampling interval types include fixed and variable sampling intervals.

24. The method of claim 23, wherein step (a) further includes:

selecting a fixed sampling interval that occurs periodically at a prescribed time interval.

25. The method of claim 23, wherein step (a) further includes:

selecting a variable sampling interval that commences in response to occurrence of a particular electronic device activity.

26. The method of claim 25, wherein said electronic device activity includes an activity driven interrupt of an electronic device processor.

27. The method of claim 21, wherein step (b) further includes:

determining at least one of an operating frequency and a power level to utilize for an electronic device component to adjust power consumed by said electronic device.

28. A method of dynamically managing power within an electronic device comprising the steps of:

(a) ascertaining and storing a plurality of parameter values associated with said electronic device during at least one sampling interval, wherein said plurality of parameters relates to at least two of: a quantity of instructions executed per time interval for an electronic device processor; an interrupt density for said electronic device processor; a performance request by a thread executing on said electronic device processor; weather and/or environmental conditions; location, orientation and/or motion of said electronic device; a signal strength of a wireless signal received by said electronic device; a time of day; and date information;

(b) determining at least one control value based on said plurality of parameter values to adjust power consumption of said electronic device; and (c) adjusting power consumption of said electronic device in accordance with said at least one control value to control electronic device power consumption.

29. The method of claim 28, wherein step (a) further includes:

selecting a type of sampling interval from among a series of sampling interval types in accordance with electronic device conditions, wherein said series of sampling interval types include fixed and variable sampling intervals.

30. The method of claim 29, wherein step (a) further includes:

selecting a fixed sampling interval that occurs periodically at a prescribed time interval.

31. The method of claim 29, wherein step (a) further includes:

selecting a variable sampling interval that commences in response to occurrence of a particular electronic device activity.

32. The method of claim 31, wherein said electronic device activity includes an activity driven interrupt of an electronic device processor.

33. The method of claim 28, wherein step (a) further includes:

ascertaining and storing values for a parameter for a plurality of sampling intervals; and step (b) further includes:

determining said at least one control value based on a parameter value from a current sampling interval and at least one parameter value from a prior sampling interval to adjust said power consumption of said electronic device.

34. The method of claim 28, wherein step (b) further includes:

determining at least one of an operating frequency and a power level to utilize for an electronic device component to adjust power consumed by said electronic device.

35. A method of dynamically managing power within an electronic device comprising the steps of:

(a) ascertaining and storing a plurality of parameter values associated with said electronic device during at least one sampling interval, wherein step (a) further includes:

ascertaining and storing values for a parameter for a plurality of sampling intervals;

(b) combining said plurality of parameter values to produce an overall parameter value and evaluating said overall parameter value to determine at least one control value to adjust power consumption of said electronic device in response to said parameter evaluation, wherein step (b) further includes:

determining a weighted average of a parameter value from a current sampling interval and at least one parameter value from a prior sampling interval to produce said overall value to determine said at least one control value to adjust said power consumption of said electronic device; and (c) adjusting power consumption of said electronic device in accordance with said at least one control value to control electronic device power consumption.

36. The method of claim 35, wherein step (a) further includes:

selecting a type of sampling interval from among a series of sampling interval types in accordance with electronic device conditions, wherein said series of sampling interval types include fixed and variable sampling intervals.

37. The method of claim 36, wherein step (a) further includes:

selecting a fixed sampling interval that occurs periodically at a prescribed time interval.

38. The method of claim 36, wherein step (a) further includes:

selecting a variable sampling interval that commences in response to occurrence of a particular electronic device activity.

39. The method of claim 38, wherein said electronic device activity includes an activity driven interrupt of an electronic device processor.

40. The method of claim 35, wherein step (b) further includes:

determining at least one of an operating frequency and a power level to utilize for an electronic device component to adjust power consumed by said electronic device.

41. A system for dynamically managing power within an electronic device comprising:
- a power management device including:
  - a sampling module to ascertain a value for at least one parameter associated with said electronic device during a sampling interval, wherein said at least one parameter includes a quantity of instructions executed by an electronic device processor within a particular time interval;
  - an analysis module to evaluate said at least one parameter value and determine at least one control value to adjust power consumption of said electronic device in response to said parameter evaluation, wherein said at least one control value includes an operating frequency and voltage of said electronic device processor, and wherein said analysis module includes:
    - an evaluation module to set at least one control value to a maximum operating frequency of said electronic device processor in response to said instruction quantity parameter value being equal to or exceeding a threshold and to set at least one control value to a desired operating frequency for said electronic device processor derived from the product of the current processor operating frequency and said instruction quantity parameter value in response to said instruction quantity parameter value being less than said threshold;
  - an adjustment module to adjust power consumption of said electronic device in accordance with said at least one control value to control electronic device power consumption.

42. A method of dynamically managing power within an electronic device comprising the steps of:
- (a) ascertaining a value for at least one parameter associated with said electronic device during a sampling interval, wherein said at least one parameter includes a quantity of instructions executed by an electronic device processor within a particular time interval;
- (b) evaluating said at least one parameter value and determining at least one control value to adjust power consumption of said electronic device in response to said parameter evaluation, wherein step (b) further includes:
  - determining an operating frequency and voltage of an electronic device processor to adjust power consumption of said electronic device in response to said parameter evaluation;
  - setting at least one control value to a maximum operating frequency of said electronic device processor in response to said instruction quantity parameter value being equal to or exceeding a threshold; and
  - setting at least one control value to a desired operating frequency for said electronic device processor derived from the product of the current processor operating frequency and said instruction quantity parameter value in response to said instruction quantity parameter value being less than said threshold; and
- (c) adjusting power consumption of said electronic device in accordance with said at least one control value to control electronic device power consumption.

* * * * *